United States Patent
Storm et al.

(10) Patent No.: US 7,945,004 B2
(45) Date of Patent: May 17, 2011

(54) METHOD AND APPARATUS FOR DETECTING A FREQUENCY BAND AND MODE OF OPERATION

(75) Inventors: Brian D. Storm, Round Lake Beach, IL (US); John R. Barr, Deer Park, IL (US); Kevin J. Bush, Northville, MI (US); Gregory W. Chance, Round Lake Beach, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 605 days.

(21) Appl. No.: 11/956,710

(22) Filed: Dec. 14, 2007

(65) Prior Publication Data

US 2009/0154614 A1   Jun. 18, 2009

(51) Int. Cl.
H04L 27/06 (2006.01)
H04B 1/16 (2006.01)

(52) U.S. Cl. .......... 375/344; 455/266
(58) Field of Classification Search .......... 375/316, 375/344, 346, 350; 455/77, 150.1, 266
See application file for complete search history.

(56) References Cited

U.S. PATENT DOCUMENTS

| | | | |
|---|---|---|---|
| 5,555,096 A | 9/1996 | Yoo | |
| 5,794,147 A | 8/1998 | Huang | |
| 6,175,561 B1 | 1/2001 | Storm et al. | |
| 6,553,229 B1 | 4/2003 | Dent | |
| 6,590,833 B1 * | 7/2003 | Teller | 367/125 |
| 7,489,745 B2 * | 2/2009 | Fudge | 375/340 |
| 7,496,158 B2 * | 2/2009 | Fudge et al. | 375/340 |
| 2002/0041639 A1 | 4/2002 | Krupezevic et al. | |
| 2003/0054783 A1 * | 3/2003 | Mason et al. | 455/150.1 |
| 2005/0192055 A1 * | 9/2005 | Niemela et al. | 455/561 |
| 2008/0266157 A1 * | 10/2008 | Gorin et al. | 341/155 |
| 2009/0137212 A1 * | 5/2009 | Belotserkovsky | 455/77 |

FOREIGN PATENT DOCUMENTS

| | | |
|---|---|---|
| EP | 0411207 A2 | 2/1991 |
| WO | 02078204 A1 | 10/2002 |

OTHER PUBLICATIONS

Patent Cooperation Treaty, "Notification of Transmittal of the International Search Report and the Written Opinion of the International Searching Authority, or the Declaration" for PCT/US2008/085804, Apr. 15, 2009, pp. 1-11.

* cited by examiner

*Primary Examiner* — Khanh C Tran
(74) *Attorney, Agent, or Firm* — Sylvia Chen

(57) ABSTRACT

A method and apparatus for detecting a frequency band and mode of operation using recursive sampling and narrowing down is disclosed. The method comprises sampling (215) by a multi-mode wireless communication device, a broad operational frequency spectrum at a first sampling rate to produce a first set of discrete signal samples. Then, the wireless communication device compares (230, 240) at least one of the energy graphs of the first set of discrete signal samples with at least one protocol-specific signature to confirm (245), if an approximate match is found. When one or more approximate matches are found, the wireless communication device narrows down (250) the broad frequency spectrum to a reduced set of frequency band(s) that correspond to the matched protocol-specific signature(s). Then the steps of sampling (215), comparing (230, 240), confirming (245), and narrowing down (250) are recursively followed till a frequency band and mode of operation is confirmed.

23 Claims, 6 Drawing Sheets

| RADIO ACCESS TECHNOLOGY | DUPLEX METHOD | MODULATION | FREQUENCY DOMAIN SIGNATURE ||| TIME DOMAIN SIGNATURE |||
|---|---|---|---|---|---|---|---|---|
| | | | CHANNEL BW | OCCUPIED BW | OPERATING FREQUENCY BAND | BURST PERIOD | SYMBOL OR CHIP RATE | PEAK-AVG |
| iDEN | TDD | M16-QAM | 25kHz | 18.6kHz | 806-825MHz UL, 851-870MHz DL, 896-901MHz UL, 935-940MHz DL | 15msec | 4ksps | 6dB |
| GSM | TDD | GMSK, 8-PSK | 200kHz | ~180kHz | 850 BAND: 824-849MHz UL, 869-894MHz DL 900 BAND: 880-915MHz UL, 925-960MHz DL 1800 BAND: 1710-1785MHz UL, 1805-1880MHz DL 1900 BAND: 1850-1910MHz UL, 1930-1990MHz DL | 577usec | 270.833ksps | 0dB(GMSK), 3dB(8PSK) |
| CDMA | FDD | QPSK | 1.25MHz (1.23MHz US) | 1.2288MHz | 824-849MHz UL, 869-894MHz DL, 887-924MHz UL, 832-869MHz DL, 1740-1770MHz UL, 1840-1870MHz DL, 1850-1910MHz UL, 1930-1990MHz DL | NA | 1.2288Mcps | 4-6dB |

*FIG. 3A*

| | | | | | | | |
|---|---|---|---|---|---|---|---|
| WCDMA | FDD/TDD | QPSK, 16-QAM, 64 QAM | 5MHz | 3.84MHz | BAND 1: 1920-1980MHz UL, 2110-2170MHz DL<br>BAND 2: 1850-1910MHz UL, 1930-1990MHz DL<br>BAND 3: 1710-1785MHz UL, 1805-1880MHz DL<br>BAND 4: 1710-1755MHz UL, 2110-2155MHz DL<br>BAND 5: 824-849MHz UL, 869-894MHz DL<br>BAND 6: 830-840MHz UL, 875-885MHz DL<br>BAND 7: 200-2570MHz UL, 2620-2690MHz DL<br>BAND 8: 880-915MHz UL, 925-960MHz DL<br>BAND 9: 1750-1785MHz UL, 1845-1880MHz DL<br>BAND 10: 1710-1770MHz UL, 2110-2170MHz DL | NA | 3.84Mcps | 5-6dB |
| 802.11a | TDD | OFDM (BPSK, QPSK, 16-QAM & 64-QAM) | 20MHz | 16.6MHz | 5.15-5.35 GHz & 5.725-5.825 GHz | 176us, 364us, 480us, 1393us | 250ksps | 9-11dB |

FIG. 3B

| | | | | | | | |
|---|---|---|---|---|---|---|---|
| 802.11b | TDD | DBPSK, DQPSK | 25MHz | 22MHz | 2.4-2.4835GHz (ALL), 2.471-2.497GHz (JAPAN ONLY), 2.4465-2.4835GHz (FRANCE ONLY), 2.445-2.475GHz (SPAIN ONLY) | 563us, 2239us, 4286us | 11Mcps | 5-6dB |
| 802.11g | TDD | OFDM | 25MHz | 22MHz | 2.4-2.4835GHz (ALL), 2.471-2.497GHz (JAPAN ONLY), 2.4465-2.4835GHz (FRANCE ONLY), 2.445-2.475GHz (SPAIN ONLY) | 176us, 364us, 480us, 1393us | 250ksps | 9-11dB |
| WiMAX (802.16) | TDD | QFDM (QPSK, 16QAM, 64QAM) | 2.5MHz, 3.5MHz, 5MHz, 7MHz, 8.75MHz, 10MHz, 20MHz | 2.3MHz, 3.2MHz, 4.6MHz, 6.6MHz, 8.2MHz, 9.2MHz, 18.4MHz | 2.3-2.4GHz, 2.5-2.7GHz, 3.3-3.9GHz | 309us, 346us, OR 432us | 9708ksps, 8696ksps, OR 6944ksps | 9-11dB |

FIG. 3C

| LTE | FDD | OFDM (QPSK, 16QAM, 64QAM) | 1.25MHz, 2.5MHz, 5MHz, 10MHz, 15MHz, 20MHz | 1.1MHz, 2.3MHz, 4.5MHz, 9MHz, 13.5MHz, 18MHz | BAND 1: 1920-1980MHz UL, 2110-2170MHz DL<br>BAND 2: 1850-1910MHz UL, 1930-1990MHz DL<br>BAND 3: 1710-1785MHz UL, 1805-1880MHz DL<br>BAND 4: 1710-1755MHz UL, 2110-2155MHz DL<br>BAND 5: 824-849MHz UL, 869-894MHz DL<br>BAND 6: 830-840MHz UL, 875-885MHz DL<br>BAND 7: 200-2570MHz UL, 2620-2690MHz DL<br>BAND 8: 880-915MHz UL, 925-960MHz DL<br>BAND 9: 1750-1785MHz UL, 1845-1880MHz DL<br>BAND 10: 1710-1770MHz UL, 2110-2170MHz DL | NA | 14ksps | 5-6dB UL, 9-11dB DL |
|---|---|---|---|---|---|---|---|---|

METHOD AND APPARATUS FOR DETECTING A FREQUENCY BAND AND MODE OF OPERATION

FIELD OF THE INVENTION

The present invention relates generally to the field of wireless communication devices having wireless communication capabilities and, more particularly, to a technique using recursive sampling and narrowing down for detecting the presence of a frequency band and mode of operation.

BACKGROUND

In order for a wireless communication device to detect the presence of a frequency band and mode of operation when the device is capable of operating in a multitude of frequency bands and modes, a large amount of processing and power is required on the part of the wireless receiver to scan the entire range of bands and modes sequentially. Wireless communication devices capable of operating in multiple modes and multiple bands, may be required to search for four or more modes distributed over multiple GHz of spectrum. For example, frequency bands of operation covering 800 MHz to 6 GHz could include CDMA, iDEN, GSM, WCDMA, WiFi, WiMAX, and LTE operating modes. Following a traditional sequential approach of scanning for a single mode across one or more frequency bands followed by a second mode across one or more frequency bands is a slow and power hungry approach. Accordingly, there is a need for new scanning methods for a wireless communication device capable of operating in multiple modes and multiple bands, which can reduce the amount of time and power it takes to detect a frequency band and mode of operation.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 is an example of frequency domain signatures and time domain signatures corresponding to frequency bands and modes of operation in accordance with some embodiments.

Figure 1:
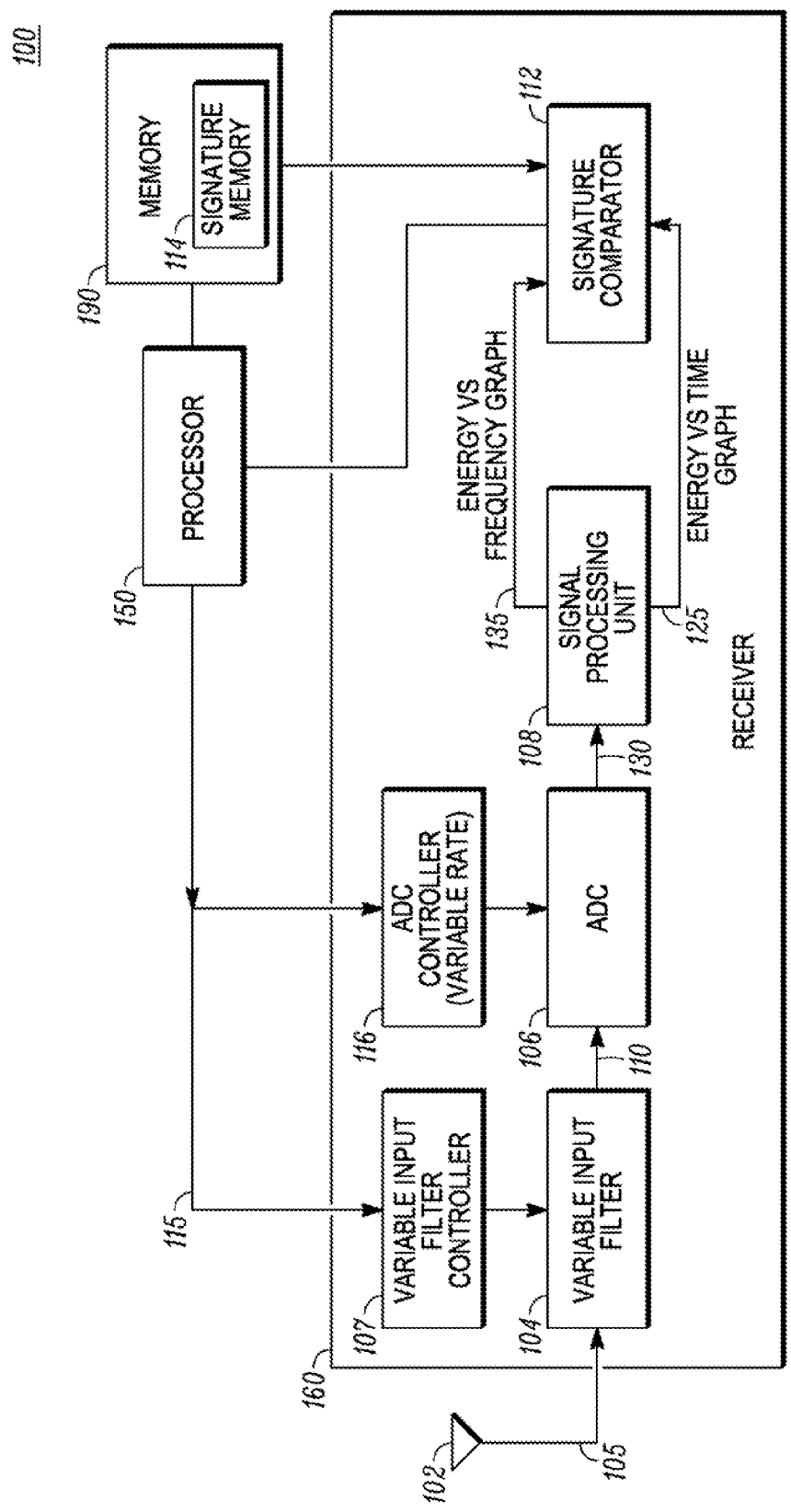
FIG. 1 is a block diagram of wireless communication device using recursive sampling and narrowing down in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A multi-mode wireless communication device samples across a portion of its operational frequency spectrum spanning one or more of its operational frequency bands at a first discrete sampling rate below a Nyquist sampling rate to produce a first set of discrete signal samples that include energy covering a corresponding portion of the operational frequency spectrum. The wireless communication device then compares at least one of the energy graphs of the first set of discrete signal samples (e.g., an energy versus time graph or an energy versus frequency graph) with at least one protocol-specific signature to look for an approximate match. When one or more approximate matches are found, the receiver narrows down the broad frequency spectrum to a reduced set of frequency band(s) that correspond to the matched protocol-specific signature(s). The wireless communication device then samples the reduced set of frequency band(s) at the same or a second sampling rate to produce a second set of discrete signal samples for the frequency band(s) and compares at least one of the energy graphs of the second set of discrete signal samples with the corresponding protocol-specific signature. This process can be repeated to continue to narrow the scanned frequency spectrum or to arrive at a specific frequency channel within a frequency band. By recursively sampling and reducing a larger frequency spectrum to a reduced set of frequency bands that match stored protocol-specific signatures, the multi-mode wireless communication device can quickly find a frequency band or frequency channel of operation while consuming less power.

FIG. 1 is a block diagram of a wireless communication device 100 using recursive sampling and narrowing down in accordance with some embodiments. The wireless communication device includes a processor 150, an antenna 102, a receiver 160 for receiving a signal through the antenna 102, and a memory 190. The memory 190 is used for storage. The memory 190 includes a signature memory 114 to store protocol-specific signatures for operational modes of the device, which will be described in more detail in conjunction with FIG. 3. The antenna 102 receives and transmits wireless signals. The processor 150 and the memory 190 are connected to the receiver 160.

The receiver 160 of the wireless communication device 100 includes a variable input filter 104, a variable input filter controller 107, an analog to digital converter (ADC) 106, an ADC controller 116, a signal processing unit 108, and a signature comparator 112. The receiver 160 is coupled at its input to the antenna 102 and is coupled to the processor 150 at its output. The variable input filter 104 may include a number of bandpass filters covering predetermined frequency bands of operation, a tunable bandpass filter, a tunable downconverter and lowpass filter, a tunable antenna, or a combination of one or more of the above. The variable input filter 104 may also include a switch or duplexer allowing a transmitter to be coupled to the antenna 102. When in use, the receiver 160 finds a frequency band of operation. It helps to reduce the amount of time and power consumed in a wireless communication device to find a frequency band or channel of operation by recursively narrowing down a frequency band input until a frequency band or channel of operation is detected.

The variable input filter 104 potentially receives the full operational frequency spectrum 105 at its input. Depending upon the input 115 from the processor 150, the variable input filter controller 107 controls the frequency range(s) for the variable input filter 104, within the full operational frequency spectrum 105 to reduce it to become the frequency band input 110. The ADC 106 receives the frequency band input 110 and converts it to discrete signal samples 130 taken at a rate decided by the ADC controller 116. The ADC controller 116 determines the rate at which the ADC 106 should sample the frequency band input. This rate may be Nyquist, sub-Nyquist, or above Nyquist depending upon the input 115 from the processor to the ADC controller 116. The signal processing unit 108 converts the discrete signal samples 130 generated by the ADC 106 into an energy versus frequency graph 135 in the frequency domain. This is commonly done by taking Fourier transforms of the discrete signal samples but alternate methods may be substituted. Alternately, or in addition, the signal processing unit 108 converts the discrete signal samples 130 generated by the ADC 106 into an energy versus time graph 125 in the time domain. This interpolation of the discrete signal samples to alter the effective sampling rate but alternate methods may be substituted.

The signature comparator 112 compares the energy versus frequency graph 135 with the frequency domain signatures stored in the signature memory 114 attempting to find one or more approximate matches. Alternately, or in addition, the signature comparator 112 compares the energy versus time graph 125 with time domain signatures in the signature memory 114 attempting to find one or more approximate matches. If there is an approximate match with a stored signature from the signature memory 114 which exceeds a variable threshold, the processor 150 signals the variable input filter controller 107 to change the frequency range of the variable input filter 104 to narrow down the frequency band input to correspond to the matching frequency bands. In the event there are multiple matches found that exceed the threshold, the processor 150 begins with the best and/or preferred matches and sequentially attempts to acquire these in their respective frequency bands until acquisition is achieved or acquisition with all matches has been attempted. A preferred match may consist of a particular mode or frequency band known to be preferred by the wireless communication device. For example, WCDMA may be preferred over GSM. In this example, when both a WCDMA and GSM signature are found, WCDMA would be pursued first. In another example, the wireless communication device's home frequency bands may be preferred over a frequency band used for roaming.

The protocol-specific signatures used for comparing by the signature comparator 112 are stored in the signature memory 114, coupled to the signature comparator 112. The signature memory 114 stores protocol-specific signatures for each frequency band or frequency channel in which the wireless communication device 100 is capable of operation.

In the case when no match is found, i.e., if all frequency bands have been searched with no signals of interest acquired, the search may resume following a variable delay with the original frequency band input and ADC sampling rate or any combination of different frequency band inputs and ADC sampling rates in an effort to reveal signatures that may have been masked by the combination used in the previous search attempt or newly available signal energy.

Figure 2:
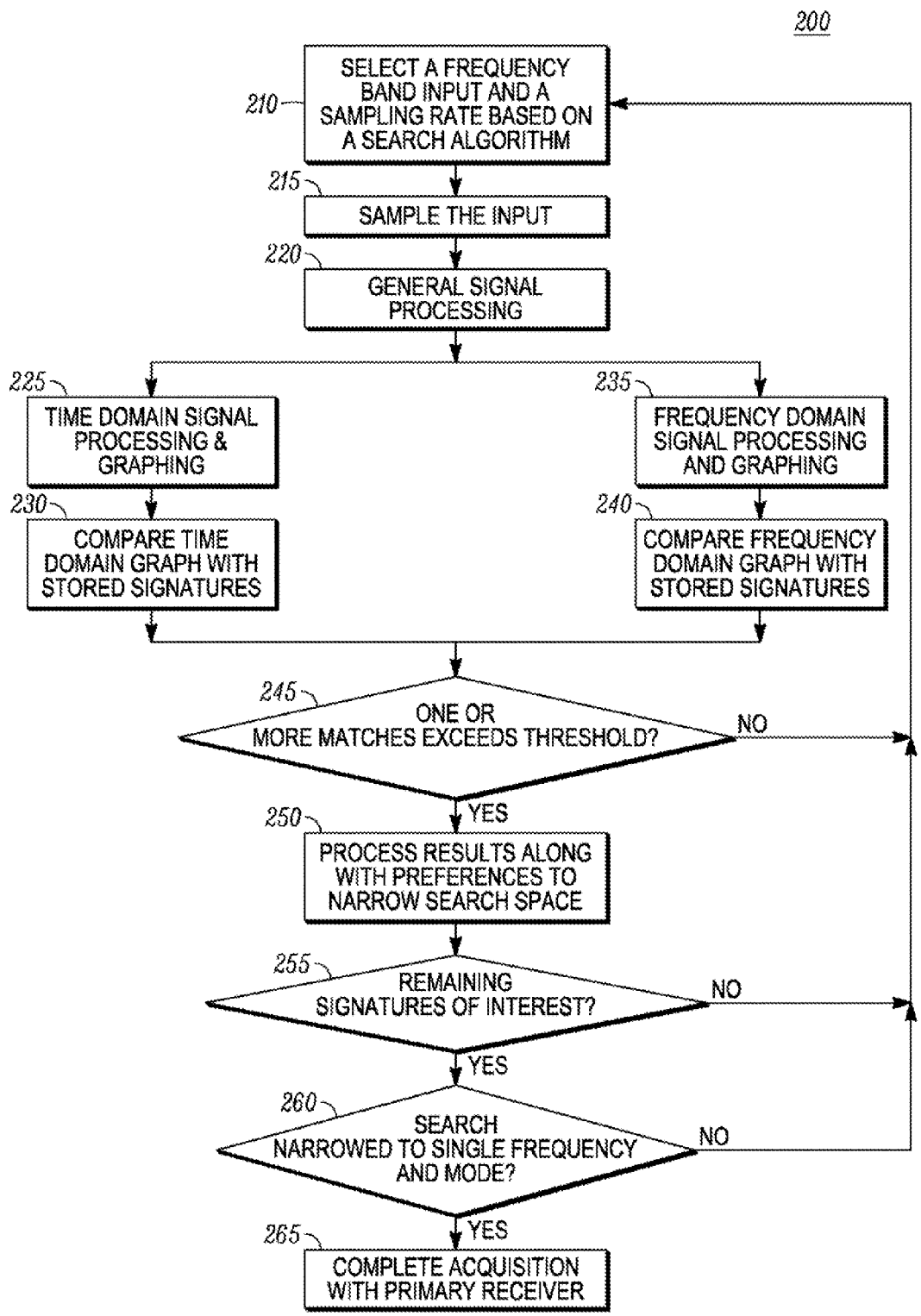
FIG. 2 is a flowchart of a method for a wireless communication device to detect a frequency band or channel and mode of operation in accordance with some embodiments.

FIG. 2 is a flowchart of a method for a receiver (such as receiver 160 shown in FIG. 1) to detect a frequency band or channel and mode of operation in accordance with some embodiments. Initially, the receiver receives or selects a frequency band input and sampling rate based on a search algorithm 210.

In one example, when the process is operated for the first time, the initial frequency band input is the full operational frequency spectrum of a wireless communication device designed to operate from 800 MHz to 6 GHz. In another example, the initial frequency band input may be a bandwidth determined by an operational setting of the device (e.g., "North American cellular" setting might have an initial frequency band input from 800 MHz to 1800 MHz while "WLAN/WiMAX" setting might have an initial frequency band input from 2.4 GHz to 6 GHz). In subsequent cycles of operation, the frequency band input keeps narrowing down based on matches with stored signatures until finally to a single frequency band and mode matches a single signature stored in the signature memory 114.

In another example, the method may repeat until the frequency band input is reduced to a potential channel that matches a signature stored in the signature memory 114.

In the example shown in FIG. 1, the variable input filter 104 within the receiver 160 of the wireless communication device 100 receives the full operational frequency spectrum 105 at its input and provides a more frequency selective frequency band input 110 at its output.

The receiver samples 215 the filtered frequency band input to produce discrete signal samples at a specified rate. In the example shown in FIG. 1, ADC 106 samples the frequency spectrum at the rate specified by the ADC controller 116 with the help of the processor 150. The specified rate may be Nyquist, sub-Nyquist or above Nyquist. Of course, a lower sampling rate reduces the power used by the receiver but also increases the chance of a "false negative" where the frequency band input includes a wireless communication signal of interest but is not found to match a stored signature.

After sampling, the receiver performs any necessary general signal processing 220 needed for both the frequency and time domain signal processing to follow.

Time domain signal processing 225 is performed on the output of 220 as needed to generate the energy versus time graph. In the example shown in FIG. 1, the function is performed by the signal processing unit 108.

The processor then compares 230 the energy versus time graph with the time domain signature stored in a signature memory. In the example shown in FIG. 1, this function is performed by a signature comparator 112.

The frequency domain signal processing 235 converts the digital signal samples from 220 into the frequency domain to produce an energy versus frequency graph of the frequency spectrum. In the example shown in FIG. 1, the function is performed by the signal processing unit 108.

The processor then compares 240 the energy versus frequency graph with the frequency domain signatures stored in a signature memory. In the example shown in FIG. 1, this function is performed by a signature comparator 112.

As a result of comparisons 230 and 240, the receiver decides 245 whether the frequency band input contains a potential mode and frequency band of interest. If there is a high degree of correlation between an energy graph and a signature of interest, the processor 150 narrows down the search space according to its search algorithm eliminating undesirable combinations of modes and frequency bands 250. If after this step, a signature of interest remains 255 and the search has been narrowed 260 to a single frequency band and mode, acquisition 265 is completed with the primary receiver. Otherwise, the search algorithm 210 is resumed with a new combination of input frequency band and sampling rate. Then the steps of sampling 215, processing 220, 225, 235, comparing 230 and 240, confirming 245, narrowing down 250, and deciding 255, are recursively followed until a frequency band and mode of operation is confirmed 260 and acquisition is accomplished 265. Each time the sampling 215 is performed, the sampling rate can be the same or different depending upon the signature identified and the frequency band of operation. In such a scenario, when a particular frequency band input is confirmed to be a frequency band of operation, the wireless communication device acquires 265 the wireless system corresponding to the detected frequency band of operation using known techniques. Similarly, a single frequency band of interest can be narrowed down to a potential channel of operation, and further to a specific channel of operation by recursively following the steps of sampling 215, processing 220, 225, 235, comparing 230 and 240, confirming 245, narrowing down 250, and deciding 255, are recursively followed until a frequency band of operation is confirmed 260 and acquisition of a specific channel of operation is confirmed 265.

For example, after detecting a frequency band of operation, the wireless communication device may sample the frequency band at or above a Nyquist rate, buffer those samples in memory, turn OFF the receiver, and demodulate the buffered samples at a rate higher than real time to acquire the wireless system associated with the frequency band of operation. This method of recursively sampling, comparing, and narrowing helps to detect a frequency band of operation much faster than the conventional systems when a wireless communication device has a large operating frequency range. Hence, the method saves power and time for the receiver when scanning and detecting frequency bands.

FIG. 3 is an example of frequency domain signatures and time domain signatures corresponding to the frequency band of operation in accordance with some embodiments. Column 310 shows examples of radio access technologies such as iDEN (Integrated Digital Enhanced Network), GSM (Global System for Mobile communications), CDMA (Code division multiple access), WCDMA (Wideband Code Division Multiple Access), 802.11a (Wireless Local Area Network), 802.11b (Wireless Local Area Network), 802.11g (Wireless Local Area Network), 802.16 (Worldwide Interoperability for Microwave Access i.e. WiMAX), and LTE (Long Term Evolution). These radio access technologies are the preferred frequency bands or channels of operation for the multi-mode, multi-band wireless communication device embodiment shown in FIG. 1. A device with fewer modes of operation will have fewer signatures. Also, as new radio access technologies are developed, and as current radio access technologies are deployed in different frequency bands in different geographic areas, new devices will have alternate or additional signatures for their modes of operation. FIG. 3 provides examples of possible signatures and is not considered to be exhaustive of all time and frequency domain signatures.

Column 320 represents the duplex methods and column 330 represents the modulation technique for the radio access technologies 310. Block 340 shows the frequency domain signatures for the radio access technologies 310. Block 350 shows the time domain signatures for the radio access technologies 310.

Within block 340, column 342 shows channel bandwidth (BW), column 344 shows occupied bandwidth (BW), and column 346 shows the potential operating bands for the corresponding radio access technologies 310. Within block 350, column 352 shows burst period, column 354 shows symbol or chip rate, and column 356 shows the peak to average ratio for the corresponding radio access technologies 310.

The rows 362, 364, 368, 372, 374, 376, 378, 382, and 384 show different radio access technologies, the duplex method and the modulation technique used by each of the radio access technologies, and the corresponding frequency domain signatures and the time domain signatures for each of the radio access technologies.

For example, row 362 shows the radio access technology iDEN that uses TDD (Time Division Duplex) duplex method and M16-QAM (Quadrature Amplitude Modulation) modulation technique. The frequency domain signatures for the radio access technology iDEN are 25 KHz channel BW, 18.6 KHz occupied BW, and various possible operating bands. These possible operating bands may be 806-825 MHz UL (uplink), 851-870 MHz DL (downlink), 896-901 MHz UL, and 935-940 MHz DL. The time domain signatures for the radio access technology iDEN are a 15 msec burst period, a 4 ksps symbol rate, and a 6 dB peak to average ratio.

The row 364 shows the radio access technology GSM that uses TDD duplex method, and GMSK (Gaussian minimum shift keying) or 8-PSK (Phase Shift Keying) modulation technique. The frequency domain signatures for the radio access technology GSM are 200 KHz channel BW, 180 KHz occupied BW, and various possible operating bands. These potential operating bands may be the 850 band, 900 band, 1800 band, and 1900 band. The 850 band may have a 824-849 MHz UL and 869-894 MHz DL. Similarly, the 900 band uses 880-915 MHz UL and 925-960 MHz DL. The 1800 band has a 1710-1785 MHz UL and 1805-1880 MHz DL. And, the 1900 band use a 1850-1910 MHz UL and 1930-1990 MHz DL. The time domain signatures for the GSM RAT (Radio Access Technology) are 577 microsecond burst period, 270.833 ksps symbol rate, 0 dB peak to average ratio if GMSK modulation technique is used and 3 dB peak to average ratio if 8-PSK modulation technique is used.

Another row 368 shows the CDMA RAT that uses FDD (Frequency Division Duplex) duplex method, and QPSK (Quadrature Phase Shift Keying) modulation technique. The frequency domain signatures for the radio access technology CDMA are 1.25 MHz channel BW, 1.2288 MHz occupied BW, and various possible operating bands. These possible operating bands may be 824-849 MHz UL, 869-894 MHz DL, 887-924 MHz UL, 832-869 MHz DL, 1740-1770 MHz UL, 1840-1870 MHz DL, 1850-1910 MHz UL, and 1930-1990 MHz DL. The time domain signatures for the CDMA RAT are 1.2288 Mcps chip rate, 4-6 dB peak to average ratio with no burst period.

The row 372 shows the radio access technology WCDMA that may use TDD or FDD duplex method and QPSK, 16-QAM, or 64-QAM modulation techniques. The frequency domain signatures for the WCDMA RAT are 5 MHz channel BW, 3.84 MHz occupied BW, and 10 potential operating bands. The operating band 1 shown is 1920-1980 MHz UL and 2110-2170 MHz DL. Operating band 2 has a 1850-1910 MHz UL and 1930-1990 MHz DL. Operating band 3 is 1710-1785 MHz UL and 1805-1880 MHz DL. Operating band 4 is 1710-1755 MHz UL and 2110-2155 MHz DL. Operating band 5 as shown is 824-849 MHz UL and 869-894 MHz DL. Operating band 6 is 830-840 MHz UL and 875-885 MHz DL. Operating band 7 is 2500-2570 MHz UL and 2620-2690 MHz DL. Operating band 8 is 880-915 MHz UL and 925-960 MHz DL. Operating band 9 is 1750-1785 MHz UL and 1845-1880 MHz DL. Operating band 10 is 1710-1770 MHz UL and 2110-2170 MHz DL. The time domain signatures for the WCDMA RAT are 8.34 Mcps chip rate, and 5-6 dB peak to average ratio.

The row 374 shows the radio access technology 802.11a that uses TDD (time division duplex) duplex method and OFDM (Orthogonal Frequency-Division Multiplexing) modulation technique. The OFDM modulation techniques used may be BPSK (Binary Phase Shift Keying), QPSK, 16-QAM, or 64-QAM modulation techniques. The frequency domain signatures for the radio access technology 802.11a are 20 MHz channel BW, 16.6 MHz occupied BW, and various potential operating bands. These possible operating bands may be 5.15-5.35 GHz, or 5.725-5.825 GHz. The time domain signatures for the 802.11a RAT are 176 microsec, 364 microsec, 480 microsec, or 1393 microsec, 250 ksps symbol rate, and 9-11 dB peak to average ratio.

The row 376 shows the 802.11b RAT that uses TDD (time division duplex) duplex method and DBPSK (Differential Binary Phase Shift Keying) or DQPSK (Differential Quadrature Phase Shift Keying) modulation technique. The frequency domain signatures for the 802.11b RAT are 25 MHz channel BW, 22 MHz occupied BW, and various possible operating bands. These operating bands may be 2.4-2.4835 GHz for all over the world, 2.471-2.497 GHz only for Japan, 2.4465-2.4835 GHz only for France, and 2.445-2.475 GHz only for Spain. The time domain signatures for the 802.11b RAT are 563 microsec, 2239 microsec, or 4286 microsec, 11 Mcps chip rate, and 5-6 dB peak to average ratio.

The row 378 shows the 802.11g RAT that uses TDD duplex method and OFDM modulation technique. The frequency domain signatures for the 802.11g RAT are 25 MHz channel BW, 22 MHz occupied BW, and various potential operating bands. These potential operating bands may be 2.4-2.4835 GHz for all over the world, 2.471-2.497 GHz only for Japan, 2.4465-2.4835 GHz only for France, and 2.445-2.475 GHz only for Spain. The time domain signatures for the 802.11g RAT are 176 microsec, 364 microsec, 480 microsec, or 1393 microsec, 250 ksps symbol rate, and 9-11 dB peak to average ratio.

The row 382 shows the 802.16 RAT that uses TDD duplex method and OFDM modulation technique. The OFDM modulation techniques used may be QPSK, 16-QAM, or 64-QAM modulation techniques. The frequency domain signatures for the 802.16 RAT are 2.5 MHz, 3.5 MHz, 5 MHz, 7 MHz, 8.75 MHz, 10 MHz, or 20 MHz channel BW, 2.3 MHz, 3.2 MHz, 4.6 MHz, 6.6 MHz, 8.2 MHz, 9.2 MHz, or 18.4 MHz occupied BW, and various possible operating bands. These possible operating bands may be 2.3-2.4 GHz, 2.5-2.7 GHz, and 3.3-3.9 GHz. The time domain signatures for the 802.16 RAT are 309 microsec, 346 microsec, or 432 microsec; 9708 ksps, 8696 ksps, or 6944 ksps symbol rate; and 9-11 dB peak to average ratio.

The last row 384 shows the radio access technology LTE that uses FDD duplex method and OFDM modulation technique. The OFDM modulation techniques used may be QPSK, 16-QAM, or 64-QAM modulation technique. The frequency domain signatures for LTE RAT are 1.25 MHz, 2.5 MHz, 5 MHz, 10 MHz, 15 MHz, or 20 MHz channel BW, 1.1 MHz, 2.3 MHz, 4.5 MHz, 9 MHz, 13.5 MHz, or 18 MHz occupied BW, and 10 possible operating bands. The operating band 1 shown is 1920-1980 MHz UL and 2110-2170 MHz DL. Operating band 2 is 1850-1910 MHz UL and 1930-1990 MHz DL. Operating band 3 is 1710-1785 MHz UL and 1805-1880 MHz DL. Operating band 4 has a 1710-1755 MHz UL and 2110-2155 MHz DL. Operating band 5 is 824-849 MHz UL and 869-894 MHz DL. Operating band 6 is 830-840 MHz UL and 875-885 MHz DL. Operating band 7 has a 2500-2570 MHz UL and 2620-2690 MHz DL. Operating band 8 is 880-915 MHz UL and 925-960 MHz DL. Operating band 9 is 1750-1785 MHz UL and 1845-1880 MHz DL. And operating band 10 is 1710-1770 MHz UL and 2110-2170 MHz DL. The time domain signatures for LTE RAT are 14 ksps symbol rate, and 5-6 dB UL and 9-11 dB DL peak to average ratio.

Thus, by comparing the energy versus frequency graphs with the frequency domain signatures and comparing the energy versus time graphs with the time domain signatures shown in FIG. 3, the wireless communication device may narrow down the full frequency spectrum to the frequency band or channel of operation very quickly. The method employed saves time as well as battery power.

Here are clear definitions of few terms used throughout this document. A "mode" is a radio access technology. A "frequency band" is a general operational frequency band that is assigned to a particular mode (e.g., GSM900 MHz). A "channel" is a particular uplink or downlink frequency within a frequency band that carries useful information. A "protocol-specific signature" is the stored information from FIG. 3 with some concessions for sub-Nyquist sampling. The wireless communication device will only store protocol-specific signatures for modes/bands for which it is capable of operation.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of described herein. The non-processor circuits may include, but are not limited to, a radio receiver, a radio transmitter, signal drivers, clock circuits, power source circuits, and user input devices. As such, these functions may be interpreted as steps of a method. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The above description and the diagrams do not necessarily require the order illustrated.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method in a wireless communication device comprising:
sampling an initial frequency band input at a first sampling rate to produce a first set of discrete signal samples for the initial frequency band input;
comparing at least one energy graph of the first set of discrete signal samples with at least one protocol-specific signature that corresponds to a radio access technology with which the wireless communication device is capable of operating;
narrowing down the initial frequency band input to at least one frequency band associated with the at least one protocol-specific signature to produce a subsequent frequency band input, if there is a match between the at least one energy graph and the at least one protocol-specific signature;
sampling the subsequent frequency band input at a second sampling rate to produce a second set of discrete signal samples; and
comparing at least one energy graph of the second set of discrete signal samples with the at least one protocol-specific signature,
wherein the at least one energy graph of the first set of discrete signal samples is either an energy versus frequency graph or an energy versus time graph, and the at least one energy graph of the second set of discrete signal samples is either an energy versus frequency graph or an energy versus time graph.

2. The method of claim 1, wherein the sampling, the comparing, and the narrowing down are repeated with different frequency band input and different sampling rate, if there is no match between the at least one energy graph and the at least one protocol-specific signature.

3. The method according to claim 1, wherein the at least one protocol-specific signature comprises:
a frequency domain signature for a radio access technology with which the wireless communication device is capable of operating.

4. The method of claim 3, wherein the frequency domain signature comprises:
at least an occupied bandwidth or an operating band.

5. The method according to claim 1, wherein the at least one protocol-specific signature comprises:
a time domain signature for a radio access technology with which the wireless communication device is capable of operating.

6. The method of claim 5, wherein the time domain signature comprises:
at least a burst period, a symbol rate, or a peak to average ratio.

7. The method according to claim 1, wherein the narrowing down, the sampling the subsequent frequency band input at a second sampling rate to produce a second set of discrete signal samples, and the comparing at least one energy graph of the second set of discrete signal samples with the at least one protocol-specific signature are repeated until the at least one frequency band is found that matches a stored protocol-specific signature.

8. The method according to claim 1, wherein the first sampling rate is at least Nyquist, sub-Nyquist, or above Nyquist.

9. The method according to claim 8, wherein the first sampling rate and the second sampling rate are the same.

10. The method according to claim 8, wherein the first sampling rate and the second sampling rate are different.

11. An apparatus comprising:
a variable input filter for selecting a frequency range of a frequency band input;
a variable input filter controller, coupled to the variable input filter, for controlling the frequency range for the variable input filter;
a processor, coupled to the variable input filter controller, for executing a search processing algorithm;
an analog to digital converter (ADC), coupled to the variable input filter, for sampling the frequency band input to produce discrete signal samples;
an ADC controller, coupled to the ADC, for controlling a sampling rate at which the ADC samples the frequency band input to produce the discrete signal samples;
a signal processing unit, coupled to an output of the ADC, for converting the discrete signal samples into an energy versus frequency graph and an energy versus time graph;
a signature comparator, coupled to an output of the signal processing unit, to compare at least one energy graph with at least one protocol-specific signature; and
a signature memory, coupled to the signature comparator, for storing the at least one protocol-specific signature for a radio access technology with which a wireless communication device is capable of operating,
wherein the at least one energy graph is either the energy versus frequency graph or an energy versus time graph.

12. The apparatus of claim 11, wherein the signature comparator provides a signal to the processor which updates the search algorithm and in turn provides a signal to the variable input filter controller to control the frequency range of the variable input filter and to the ADC controller to control the sampling rate of the ADC.

13. The apparatus of claim 11, wherein the signature comparator detects a presence of at least one frequency band of operation for the wireless communication device.

14. The apparatus of claim 11, wherein the variable input filter comprises a component selected from a group comprising: a bandpass filter covering a predefined frequency band of interest, a tunable bandpass filter, a tunable downconverter and lowpass filter, or a tunable antenna.

15. A method comprising:
sampling a frequency band of interest at a first sampling rate to produce a first set of discrete signal samples for the frequency band of interest;
comparing at least one energy graph with at least one protocol-specific signature;
narrowing down the frequency band of interest to at least one potential channel of operation associated with the at least one protocol-specific signature, if the at least one energy graph of the first set of discrete signal samples matches the at least one protocol-specific signature;

sampling the at least one potential channel of operation at a second sampling rate to produce a second set of discrete signal samples; and comparing at least one energy graph of the second set of discrete signal samples with the at least one protocol-specific signature to produce at least one specific channel of operation, wherein the at least one energy graph of the first set of discrete signal samples is either an energy versus frequency graph or an energy versus time graph, and the at least one energy graph of the second set of discrete signal samples is either an energy versus frequency graph or an energy versus time graph.

16. The method of claim 15, wherein the sampling, the comparing, and the narrowing down is repeated with different frequency band of interest and different sampling rate, if there is a no match between the at least one energy graph and the at least one protocol-specific signature.

17. The method according to claim 15, wherein the narrowing down, the sampling the at least one potential channel of operation at a second sampling rate to produce a second set of discrete signal samples, and the comparing the at least one energy graph of the second set of discrete signal samples with the at least one protocol-specific signature to produce at least one specific channel of operation are repeated.

18. The method according to claim 15, wherein the at least one potential channel of operation is a channel where there is a high probability of a presence of the at least one specific channel of operation.

19. The method of claim 18, wherein there is more than one potential channel of operation.

20. The method according to claim 15, wherein the at least one potential channel of operation is the at least one specific channel of operation.

21. The method of claim 20, wherein there is more than one specific channel of operation.

22. The method according to claim 15, wherein the at least one specific channel of operation is a channel where a signal is detected to be present.

23. The method of claim 15, wherein the at least one potential channel of operation is verified to be the at least one specific channel of operation, if the at least one energy graph of the second set of discrete signal samples matches the at least on protocol-specific signature.

* * * * *